(12) United States Patent
Davidian

(10) Patent No.: US 7,651,001 B2
(45) Date of Patent: Jan. 26, 2010

(54) FLUID SEPARATOR

(75) Inventor: Steven Davidian, Chagrin Falls, OH (US)

(73) Assignee: Zebra Skimmers Corp., Solon, OH (US)

( * ) Notice: Subject to any disclaimer, the term of this patent is extended or adjusted under 35 U.S.C. 154(b) by 80 days.

(21) Appl. No.: 11/924,876

(22) Filed: Oct. 26, 2007

(65) Prior Publication Data

US 2009/0107911 A1    Apr. 30, 2009

(51) Int. Cl.
*C02F 1/40* (2006.01)
(52) U.S. Cl. .................... 210/526; 210/540; 210/923
(58) Field of Classification Search ............. 210/242.3, 210/242.4, 523, 526, 540, 923, 924, 776
See application file for complete search history.

(56) References Cited

U.S. PATENT DOCUMENTS

| | | | |
|---|---|---|---|
| 3,508,663 A * | 4/1970 | Brill ............................ | 210/924 |
| 3,640,394 A | 2/1972 | Brill et al. | |
| 3,695,451 A | 10/1972 | Schmidt, Jr. et al. | |
| 3,709,369 A | 1/1973 | Brill et al. | |
| 3,986,959 A * | 10/1976 | Bagot et al. ............... | 210/242.4 |
| 4,274,957 A | 6/1981 | Koller | |
| 4,316,804 A * | 2/1982 | Bocard et al. ............ | 210/242.4 |
| 4,876,011 A | 10/1989 | Betts et al. | |
| 5,062,953 A | 11/1991 | Lewan | |
| 5,080,781 A | 1/1992 | Evins, IV | |
| 5,164,083 A * | 11/1992 | Ahrendt ................... | 210/242.3 |
| 5,259,958 A | 11/1993 | Bronnec et al. | |
| 5,381,861 A * | 1/1995 | Crafton et al. ............. | 166/77.2 |
| 5,403,478 A * | 4/1995 | Brinkley .................. | 210/242.4 |
| 5,474,685 A | 12/1995 | Breslin | |
| 5,645,733 A | 7/1997 | Hobson | |
| 5,968,354 A | 10/1999 | Brinkley | |
| 6,887,387 B2 | 5/2005 | Hobson | |
| 7,104,407 B2 | 9/2006 | Davidian et al. | |
| 7,296,694 B2 * | 11/2007 | Weymouth .................. | 210/540 |
| 7,431,166 B2 * | 10/2008 | Davidian .................... | 210/526 |
| 2004/0164014 A1 | 8/2004 | Rhein et al. | |
| 2006/0283298 A1 | 12/2006 | Davidian | |

* cited by examiner

*Primary Examiner*—Christopher Upton
(74) *Attorney, Agent, or Firm*—Pearne & Gordon LLP

(57) ABSTRACT

An apparatus separates a first fluid from a mixture of fluids. The apparatus includes a housing that can have one or more entry openings and one or more exit openings. An endless flexible strip of a material having an affinity for the first fluid is arranged to be advanced through the housing. An advancing assembly advances the endless flexible strip through an entry opening in the housing and through an exit opening in the housing, thereby advancing successive portions of the endless flexible strip sequentially from a position out of contact with the first fluid to a position of contact with the first fluid and again to a position out of contact with the first fluid. More than one pathway can be located within the housing along which the endless flexible strip can be selectively advanced. A means for removing from the endless flexible strip quantities of the first fluid that adhere to the endless flexible strip can be provided.

14 Claims, 2 Drawing Sheets

FLUID SEPARATOR

BACKGROUND OF THE INVENTION

The present invention relates generally to an apparatus for separating fluids and, more specifically, to an apparatus for removing tramp oil from coolants used in machining centers.

There are a variety of instances where it is desired to separate a fluid from a mixture of fluids. For example, in many machining operations, an aqueous coolant is sprayed or flowed at the location or site where a cutting tool engages a workpiece for lubricating and cooling the cutting tool and workpiece. The coolant is then collected in a tank and recycled for continuous use for as long as possible since coolants of this type are fairly expensive and it is advantageous to maintain the coolants in a usable condition. Typical machining operations also employ lubricating oils for lubricating moving parts. Eventually, the lubricating oils drip or flow into the tank where the aqueous coolant is being collected. In the tank, the lubricating oils float upon the surface of the coolant because they are of a lighter weight and lower density than the coolant. These lubricating oils, typically referred to as "tramp oil", eventually contribute to bacterial growth within the tank holding the aqueous coolant, resulting in a foul odor and reducing the useful life of the aqueous coolant. Moreover, due to environmental considerations, the oil-contaminated aqueous coolant must be treated as a hazardous waste and its disposal represents an environmental and economic concern.

A number of separating, or skimming, devices have been developed over the years to remove tramp oil from the surface of an aqueous coolant held in a tank associated with a machining operation. One type of such device is a disk skimmer that includes a disk that extends into contact with the tramp oil that has collected on top of the aqueous coolant. Rotation of the disk adjacent the surface of the fluids in the tank results in the pick-up of the tramp oil by the disk and removal of the tramp oil from the tank. The tramp oil is scraped from the disk by a blade, collected and removed. Belt skimmers also are used. Such skimmers employ an endless belt that removes the tramp oil from the surface of the aqueous coolant. As with the disk skimmers, the tramp oil is scraped from the belt, collected and removed.

Tube skimmers also are available for removing tramp oil from the surface of an aqueous coolant. A tube skimmer can be mounted to the side of the tank containing the tramp oil and coolant and involves running an endless, flexible, small diameter tube into the tramp oil at the surface of the coolant. The tube collects the tramp oil on its outer surface and brings the tramp oil to a scraper where the tramp oil is removed and deposited in a suitable container for disposal. Examples of tube skimmers are disclosed in U.S. Pat. No. 7,104,407 and United States patent application Publication No. US 2006/0283298.

SUMMARY OF THE INVENTION

According to one aspect, an apparatus is provided for separating a first fluid from a mixture of fluids in a container, the first fluid being substantially immiscible with respect to one or more other fluids in the mixture. The apparatus comprises a housing having at least one entry opening and at least one exit opening and an endless flexible strip of a material having an affinity for the first fluid and arranged to be advanced through the housing. The apparatus also comprises an advancing assembly engaging the endless flexible strip for advancing the endless flexible strip first through an entry opening in the housing and thereafter through an exit opening in the housing, thereby advancing successive portions of the endless flexible strip sequentially from a position out of contact with the first fluid to a position of contact with the first fluid and again to a position out of contact with the first fluid. More than one pathway is located within the housing along which the endless flexible strip may be selectively advanced between entry and exit openings in the housing. In one case, one pathway of the more than one pathway can comprise a first pathway that includes a substantially straight first leg that proceeds from an entry opening and a substantially straight second leg that proceeds to an exit opening, the first leg and the second leg being joined at an angle of approximately 90 degrees. In another case, one pathway of the more than one pathway can comprise a second pathway that comprises a substantially straight line that extends between entry and exit openings in the housing along which the endless flexible strip is advanced. In yet another instance, one pathway of the more than one pathway can comprise a third pathway that includes a substantially straight first leg that proceeds from an entry opening and a substantially straight second leg that proceeds to an exit opening and is substantially parallel to the first leg, the first leg and the second leg being joined by an intermediate leg of the third pathway.

According to another aspect, an apparatus is provided for separating a first fluid from a mixture of fluids in a container, the first fluid being substantially immiscible with respect to one or more other fluids in the mixture. The apparatus comprises a housing having an entry opening and an exit opening and an endless flexible strip of a material having an affinity for the first fluid and arranged to be advanced through the housing. The apparatus also includes an advancing assembly that engages the endless flexible strip for advancing the endless flexible strip first through the entry opening in the housing and thereafter through the exit opening in the housing, thereby advancing successive portions of the endless flexible strip sequentially from a position out of contact with the first fluid to a position of contact with the first fluid and again to a position out of contact with the first fluid. A pathway is provided within the housing along which the endless flexible strip is advanced between the entry opening and the exit opening in the housing. The pathway comprises a substantially straight line between the entry opening and the exit opening in the housing.

In the foregoing aspects, the assembly engaging the endless flexible strip can be contained within the housing and comprise circular rotating gears having meshing gear teeth arranged around the circumference of each gear and cooperating surfaces. The cooperating surfaces can positively engage the strip between the cooperating surfaces with sufficient force applied to the endless flexible strip so that rotative movement of the gears relative to one another sequentially advances successive portions of the endless flexible strip.

In an aspect wherein the assembly engaging the endless flexible strip can be contained within the housing and can comprise circular rotating gears that have meshing gear teeth arranged around the circumference of each gear and cooperating surfaces and the housing have at least one entry opening and one exit opening, there can be at least one pathway within the housing along which the endless flexible strip may be selectively advanced between entry and exit openings in the housing. At least one of the at least one pathway would have a substantially straight first leg that proceeds from one of the at least one entry opening to a location between the cooperating surfaces of each gear where the cooperating surfaces positively engage the strip. In such an aspect, the at least one of the at least one pathway having a substantially straight first leg that proceeds from one of the at least one entry opening to a location between the cooperating surfaces of each gear where the cooperating surfaces positively engage the strip additionally can have a substantially straight second leg that proceeds in a straight line from the location between the cooperating surfaces of each gear where the cooperating surfaces positively engage the strip to one of the at least one exit opening. Also, the at least one of the at least one pathway having a substantially straight first leg that proceeds from one of the at least one entry opening to a location between the cooperating surfaces of each gear where the cooperating surfaces positively engage the strip additionally can have a second leg that proceeds from the location between the cooperating surfaces of each gear where the cooperating surfaces positively engage the strip to one of the at least one exit opening at an angle of approximately 90 degrees to the substantially straight first leg. Further, the at least one of the at least one pathway having a substantially straight first leg that proceeds from one of the at least one entry opening to a location between the cooperating surfaces of each gear where the cooperating surfaces positively engage the strip additionally can have a second leg that proceeds from the location between the cooperating surfaces of each gear where the cooperating surfaces positively engage the strip to one of the at least one exit opening in a direction that is generally parallel to the first leg.

In the foregoing aspects, the endless flexible strip can have a generally circular cross-section and the cooperating surfaces of the circular rotating gears have a concave configuration that is generally complementary with the circular cross-section of the endless flexible strip. The cooperating surfaces can be recessed radially inwardly of the meshing gears of the circular rotating gear teeth toward the axes of rotation of the circular rotating gears.

Further in the foregoing aspects, a means can be provided for removing from the endless flexible strip quantities of the first fluid that adhere to the endless flexible strip and that means can comprise a scraping annulus through which the successive portions of the endless flexible strip pass. The scraping annulus can have an inside diameter sufficiently small that the first fluid is removed from the endless flexible strip as the successive portions of the endless flexible strip pass through the scraping annulus. The scraping annulus can be located such that the first fluid is removed from the endless flexible strip prior to the successive portions of the endless flexible strip entering an entry opening in the housing.

BRIEF DESCRIPTION OF THE DRAWINGS

The foregoing and other features and advantages of the present invention will become apparent to those skilled in the art upon reading the following description with reference to the accompanying drawings, in which.

In the drawings, the same reference numerals are used to designate the same elements in the figures in order to facilitate the description of the invention and certain features and components may be shown in a somewhat schematic form.

DETAILED DESCRIPTION OF AN EMBODIMENT OF THE INVENTION

Figure 1:
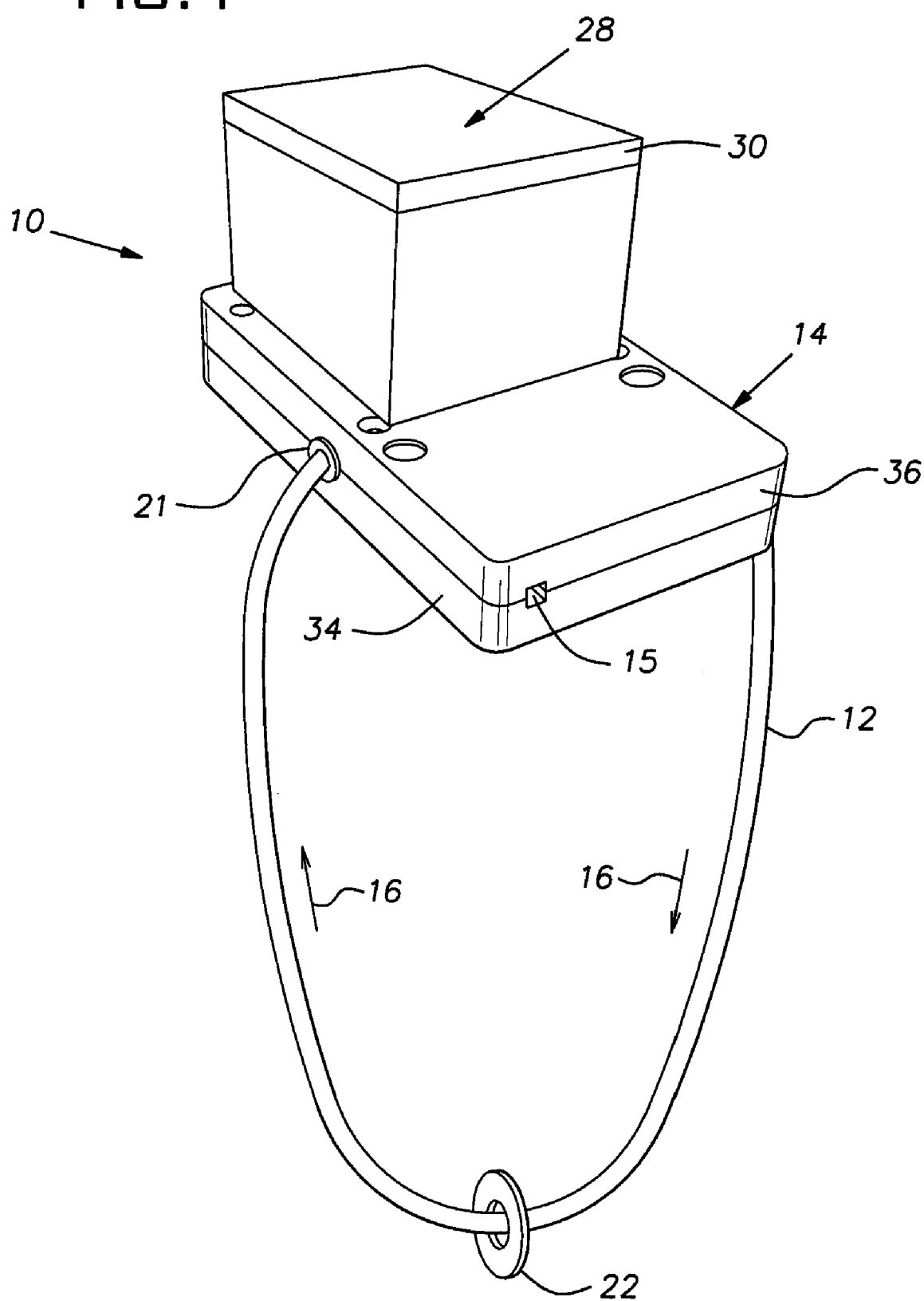
FIG. 1 is a perspective view of an apparatus for separating fluids in accordance with an aspect of the present invention.

For the purposes of facilitating an understanding of the principles of the invention, reference will now be made to the embodiment of the invention depicted in the drawings. However, the invention is not limited in its application to the details of construction or the arrangement of components set forth in the drawings or the following description. Other embodiments of the invention are possible, and the invention is capable of being practiced and carried out in ways other than as described. Also, it is to be understood that the terminology and phraseology used in describing the invention is employed for the purpose of promoting an understanding of the invention and should not be considered as limiting. For example, the phrase "process fluid" should be understood to include not only a coolant used in connection with the cutting and cooling functions of a machining process, but also other fluids such as, for example, a wash fluid, or a metal-working fluid that can collect liquid impurities during the machining process and from which the liquid impurities are to be removed. Additionally, the phrase "tramp oil" is used generally to refer to any fluid that may contaminate the process fluid during the machining process such as, for example, cutting oils, lubricants, way oils, mill oils, hydraulic fluids, and other fluids that are not miscible or soluble in the process fluid. Further, the phrase "oily process fluid" is used generally herein to refer to a process fluid having a high concentration of a tramp oil.

Turning to the drawings, there is shown in FIG. 1 an embodiment of an apparatus according to the invention for separating a first fluid from a mixture of fluids in a container. The illustrated apparatus comprises a tube skimmer, indicated generally at 10, that incorporates the features of the present invention. In use, the tube skimmer of the illustrated embodiment could be mounted, for example, at a support platform (not shown) that, in turn, could be mounted to a process fluid tank, or container (not shown) in which the mixture of fluids is held or any other suitable supporting structure adjacent the process fluid tank. In a machining operation, the process fluid tank typically would contain a process fluid, such as a coolant, and a tramp oil that is substantially immiscible with respect to and floats on top of the coolant. It will be understood that the apparatus of the invention is not limited to use in separating a tramp oil from a coolant in a machining operation but has general application to circumstances where a first fluid is separated from a mixture of fluids in a container, the first fluid being substantially immiscible with the one or more other fluids in the mixture.

Figure 2:
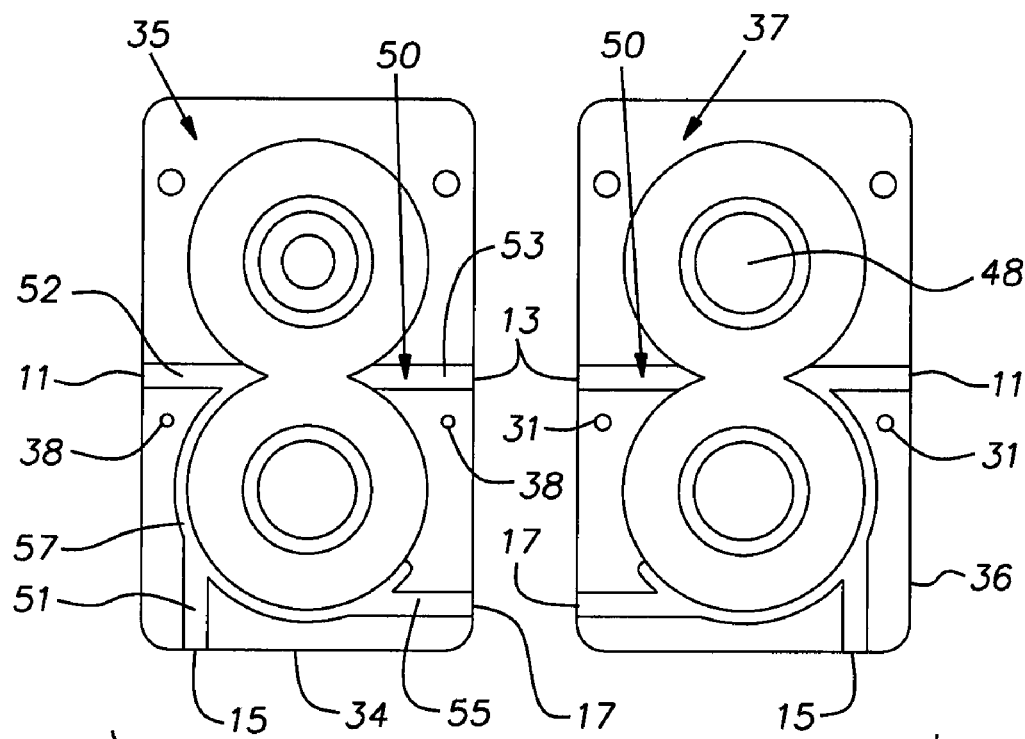
FIG. 2 is a top view of the interior of certain components of the apparatus of FIG. 1.

The tube skimmer 10 comprises a housing, indicated generally at 14 and including an upper housing portion 36 and a lower housing portion 34, and an endless flexible strip 12 of a material that has an affinity for the first fluid in the mixture of fluids such as a tramp oil. The endless flexible strip 12 is arranged to be advanced through the housing 14 as described in greater detail below. In the illustrated embodiment, the endless flexible strip 12 comprises a tube having a generally circular cross section and made of a material such as a pliable polyethylene, successive portions of which are continuously advanced through the housing 14 in a direction indicated by the arrows 16 in the embodiment shown in the drawings. As best seen in FIG. 2, wherein the upper housing portion 36 and the lower housing portion 34 of the housing 14 are shown as separated in the manner of opening a book so as to reveal their internal features, the illustrated embodiment is shown to include openings 11, 13, 15 and 17 between the exterior and the interior of the housing. As explained in greater detail below, the openings 11, 13, 15 and 17 can function either as entry openings for the entry of the endless flexible strip into the interior of the housing 14 or exit openings for the exiting of the endless flexible strip 12 from the interior of the housing 14. In any event, the housing 14 will have at least one entry opening and one exit opening according to one aspect of the invention. In the embodiment shown in the drawings, opening 11 acts as an entry opening through which the strip 12 firsts enters the housing 14.

The endless flexible strip 12 can be of any suitable length and diameter. The flexible strip of material need not comprise a tube or be circular in cross-section. For example, the endless flexible strip can be made of a solid material and have a rectangular or square cross-section. Additionally, the strip can be made of a material other than polyethylene so long as the material has an affinity for the fluid that is being separated. Further details regarding the manner in which successive portions of the endless flexible strip 12 can be advanced through the housing 14 are set forth below.

The apparatus of the invention further includes means for maintaining successive portions of the endless flexible strip 12 in contact with the tramp oil as successive portions of the strip are sequentially advanced through the housing 14 and the tramp oil. As best viewed in FIG. 1, the successive portions of the endless flexible strip 12 would be disposed downwardly of the housing 14. In the embodiment of the invention illustrated in the drawings, the means for maintaining the successive portions of the endless flexible 12 in contact with the tramp oil comprises a generally ring-shaped weight, or weighting annulus 22 that is located on the endless flexible strip 12 such that the strip 12 passes through the inner diameter of the weighting annulus. The weighting annulus 22 is properly sized to have sufficient weight so as to cause the successive portions of the endless flexible strip 12, as they are advanced, to remain in contact with the tramp oil located in a process fluid tank for example. It is to be appreciated that any suitable type of weighting element can be employed to maintain the strip 12 in contact with the tramp oil and the weighting element need not be in the shape an annulus or ring. Further, as an alternative, the means for maintaining the successive portions of the endless flexible strip 12 in contact with the tramp oil can comprise a float formed of a buoyant material properly sized to have sufficient buoyancy so as to suspend successive portions of the strip 12 at or near the surface of the tramp oil located in the process fluid tank. As a result, successive portions of the endless flexible strip 12, as they are advanced, will remain in contact with the tramp oil. When the endless flexible strip 12 contacts the oily process fluid in the process fluid tank, because the strip has an affinity for the tramp oil, the tramp oil from the oily process fluid is attracted to the strip 12 and, thus, collects onto the surface of the strip 12.

Figures 3, 4:
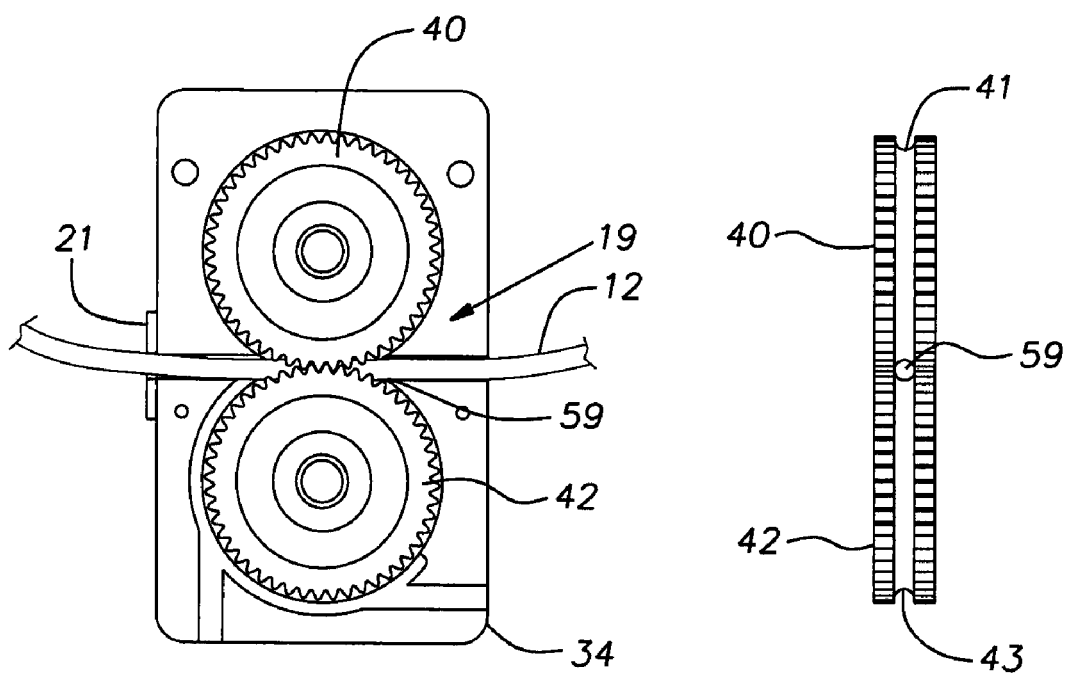
FIG. 3 is a partial top view of the interior of certain components of the apparatus of FIG. 1.
FIG. 4 is an elevational end view of the advancing mechanism, in the form of rotating gears, employed to advance the endless flexible strip of the apparatus of FIG. 1.

Turning now to FIGS. 2, 3 and 4, there are illustrated certain internal components and features of the housing 14. In particular, there is shown in FIG. 3 the advancing assembly, indicated generally at 19, for engaging the endless flexible strip 12 for advancing the endless flexible strip first through an entry opening in the housing 14 and thereafter through an exit opening in the housing 14, thereby advancing successive portions of the endless flexible strip sequentially from a position out of contact with the first fluid to a position of contact with the first fluid and again to a position out of contact with the first fluid.

As described above and shown in FIG. 2, the housing 14 includes a lower housing portion 34 having an interior face, indicated generally at 35, and an upper housing portion 36 having an interior face, indicated generally at 37. When the tube skimmer 10 is assembled, the interior face 35 of the lower housing portion 34 and the interior face 37 of the upper housing 36 engage one another and the lower and upper housing portions, 34 and 36, respectively, can be secured together by fasteners, such as screws for example that extend from the exterior of the upper housing portion 36 through the openings 31 in the upper housing portion 36 and are screwed into threaded openings 38 provided in the lower housing portion 34.

Contained within the housing 14 are a first advancing member 40 and a second advancing member 42 for cooperatively advancing successive portions of the endless flexible strip sequentially from a position out of contact with the first fluid or tramp oil to a position of contact with the tramp oil and again to a position out of contact with the tramp oil. The first and second advancing members have respective cooperating surfaces, 41 and 43 respectively as shown in FIG. 4, that positively engage a portion of the endless flexible strip 12 between the cooperating surfaces with sufficient force applied to that portion of the strip so that movement of the first and second advancing members relative to one another sequentially advances successive portions of the endless flexible strip from an entry opening in the housing 14 where the strip 12 enters the housing and is engaged by the cooperating surfaces of the first and second advancing members to an exit opening where the endless flexible strip exits the housing 14 after exiting from between the cooperating surfaces 41 and 43 of the first and second advancing members. More specifically, the advancing assembly 19 includes a gearing mechanism wherein the first advancing member comprises a first circular rotating gear 40 and the second advancing member comprises a second circular rotating gear 42. Each circular rotating gear has meshing gear teeth arranged around the circumference of the gear and a respective endless cooperating surface, 41 and 43, that is recessed radially inwardly of the meshing gear teeth of the gear toward the axis of rotation of the gear.

Rotation of the gears 40 and 42 cooperatively advances successive portions of the endless flexible strip 12 sequentially through the housing 14 and the tramp oil that floats on the surface of the coolant such that the strip proceeds from a position out of contact with the first fluid to a position of contact with the first fluid and again to a position out of contact with the first fluid. The source of motive power for rotating gears 42 and 44 can comprise a motor (not shown) that is contained within a motor housing 28. The motor housing 28 has a removable cover 30 to facilitate access to the motor within the housing. The motor includes a drive shaft that drives the gears 40 and 42 so as to advance successive portions of the endless flexible strip 12 for the purpose of picking up tramp oil from the surface of the coolant, as the successive portions of the strip 12 advance. The drive shaft can be connected to either gear 40 or gear 42 and the motor driving the drive shaft can be reversible so that whichever gear is being driven can be driven in either a clockwise or counter clockwise direction.

In the embodiment of the drawings, the drive shaft of the motor in the motor housing 28 that drives the gears 40 and 42 would enter housing 14 through an aperture 48 in the top housing portion 36 and be secured to the gear 40. The gears 40 and 42 rotate in opposite directions. In the embodiment of the drawings where the drive shaft is secured to gear 40, gear 40 would rotate counter clockwise when viewed in the attitude of FIG. 3, while gear 42 would rotate clockwise when viewed in the attitude of FIG. 3. The converse would be true when the drive shaft is secured to gear 42. In any event, the opposite rotation between the gears 40 and 42 creates a pinch point 59 between the gears 40 and 42 where the endless flexible strip 12 is engaged by the cooperating surfaces 41 and 43, as best seen in FIGS. 3 and 4, so as to advance successive portions of the endless flexible strip 12 through the pinch point 59. The upper housing portion 36, in addition to its other functions, provides a protective cover for the gearbox components to protect not only the advancing assembly 19, but also to afford a level of safety for the operators.

As best shown in FIG. 4, where the gears 40 and 42 are shown as removed from the lower housing portion 34, the cooperating surfaces 41 and 43 of the gears 40 and 42, respectively, comprise endless cooperating surfaces that engage a portion of the strip 12 between the cooperating surfaces at the pinch point 59. This engagement occurs with sufficient force applied to the strip so that movement of the gears 40 and 42 relative to one another sequentially advances successive portions of the endless flexible strip 12 from the entry opening 11, where the endless flexible strip 12 enters the housing 14 and is engaged by the cooperating surfaces 41 and 43 of the first and second circular rotating gears 40 and 42, respectively, to the exit opening 13, where the strip 12 exits the housing 14 after exiting from between the cooperating surfaces 41 and 43 of the first and second circular rotating gears respectively.

Although not required, each of the cooperating surfaces 41 and 43 of the gears 40 and 42, respectively, can have a concave configuration that is generally complementary with the circular cross-section of the endless flexible strip 12 such as the polyethylene tube shown in the drawings. The gear configuration of the present invention, by creating a pinch point 50 between the cooperating surfaces 41 and 43, increases tube drive grip and mitigates the tube binding and jamming that can be experienced with other tube skimming apparatuses.

The tube skimmer 10 of the invention can include one or more pathways within the housing 14 along which the endless flexible strip 12 may be selectively advanced between entry and exit openings in the housing. Thus, in the embodiment of the invention illustrated in the drawings three such optional pathways are provided. As best seen in FIG. 2, a first such pathway within the housing 14 along which the endless flexible strip is advanced between the entry opening 11 and an exit opening 13 in the housing 14 comprises a substantially straight line pathway, indicated generally at 50, between the entry opening 11 and the exit opening 13 in the housing. The substantially straight line pathway 50 can be established by providing complementary grooves or channels in the lower housing portion 34 and the upper housing portion 36 of the housing 14. The channels act to maintain the endless flexible strip on an appropriate course as it moves through the housing 14 along the first pathway 50. Means other than grooves or channels can be provided within the housing 14 to confine the flexible endless strip to the first pathway 50.

A second pathway within the housing 14 along which the endless flexible strip 12 can be advanced between the entry opening 15 and the exit opening 13 in the housing 14 comprises a substantially straight first leg 51 that proceeds from the entry opening 11 and a substantially straight second leg 53 that proceeds to the exit opening 13. The first leg 51 and the second leg 53 are joined by an intermediate leg 57 of the second pathway at an angle of approximately 90 degrees.

A third pathway within the housing 14 along which the endless flexible strip 12 can be advanced between an entry opening 17 and the exit opening 13 in the housing 14 comprises a substantially straight first leg 55 that proceeds from the entry opening 17 and the substantially straight second leg 53 that proceeds to the exit opening 13 and is substantially parallel to the first leg. The first leg 55 and the second leg 53 are joined by the intermediate leg 57 of the third pathway.

An aspect of the invention illustrated in the drawings concerns the manner in which the flexible strip 12 can be directed through an entry opening to the gears 40 and 42 when gear 40 is arranged to rotate in a clockwise direction causing gear 42 to rotate in a counter clockwise direction as viewed in FIG. 3. In that case, the apparatus shown in the illustrated embodiment would have at least one entry opening such as entry opening 13 and at least one exit opening such as exit opening 11, exit opening 15 and exit opening 17. At the same time there would be at least one pathway within the housing 14 such as pathway 50 along which the endless flexible strip may be selectively advanced between one of the at least one entry openings such as entry opening 13 and one of the at least one exit openings in the housing such as exit opening 11. At least one of the at least one pathway such as pathway 50 would have a substantially straight first leg such as leg 53 that proceeds from one of the at least one entry opening such as opening 13 to a location such as pinch point 59 between the cooperating surfaces of each gear 40 and 42 where the cooperating surfaces positively engage the strip 12.

Continuing with the conditions described in the preceding paragraph, there can be in the at least one of the at least one pathway such as pathway 50 having a substantially straight first leg such as leg 53 that proceeds from one of the at least one entry opening such as entry opening 13 to a location such as pinch point 59 between the cooperating surfaces of each gear 40 an 42 where the cooperating surfaces positively engage the strip 12, additionally, a substantially straight second leg such as leg 52 that proceeds in a straight line from the location such as pinch point 59 between the cooperating surfaces of each gear 40 and 42 where the cooperating surfaces positively engage the strip 12 to one of the at least one exit opening such as exit opening 11.

Continuing further, there can be in the at least one of the at least one pathway such as pathway 50 having a substantially straight first leg such as leg 53 that proceeds from one of the at least one entry opening such as entry opening 13 to a location such as pinch point 59 between the cooperating surfaces of each gear 40 an 42 where the cooperating surfaces positively engage the strip 12, additionally, a second leg such as the leg comprising 51 and 57 that proceeds from the location such as the pinch point 59 between the cooperating surfaces of each gear 40 and 42 where the cooperating surfaces positively engage the strip 12 to one of the at least one exit opening such as exit opening 15 at an angle of approximately 90 degrees to the substantially straight first leg such as leg 53.

In addition to the foregoing, there can be in the at least one of the at least one pathway such as pathway 50 having a substantially straight first leg such as leg 53 that proceeds from one of the at least one entry opening such as entry opening 13 to a location such as pinch point 59 between the cooperating surfaces of each gear 40 an 42 where the cooperating surfaces positively engage the strip 12, additionally, a second leg such as the leg comprising 55 and 57 that proceeds from the location such as the pinch point 59 between the cooperating surfaces of each gear 40 and 42 where the cooperating surfaces positively engage the strip 12 to one of the at least one exit opening such as exit opening 17 in a direction that is generally parallel to the substantially straight first leg such as leg 53.

It will be understood that although the embodiments of the invention illustrated in the drawings contain three optional pathways along which the endless flexible strip 12 can be advanced through the housing 14, a greater or lesser number of pathways can be provided. In particular, a housing can be provided that contains a single pathway arranged so that the strip 12 proceeds through an entry opening in the housing 14 directly in substantially a straight line to the rotating gears and from the rotating gears directly in substantially a straight line through an exit opening in the housing 14. This type of pathway is shown in FIG. 3, although, in FIG. 3, alternate pathways are also provided.

As noted, the tube skimmer 10 of the invention can provide for alternate directions of advancement for the endless flexible strip 12 in each of the pathways provided as described above. Consequently, it will be understood that when the endless flexible strip is advanced along the pathway 50 for example, opening 13 can comprise either an entry opening or an exit opening and opening 11 can comprise either an exit opening or an entry opening, respectively.

The apparatus of the invention also can include means for removing from the successive portions of the flexible endless strip 12, as the successive portions of the strip are sequentially advanced, tramp oil that has collected on successive portions of the tube as a result of the contact between the tramp oil and the successive portions of the tube. This means for removing tramp oil in the embodiments of the invention shown in the drawings comprises a scraper 21 that is provided outside the opening 11 of the housing 14 when opening 11 is serving as an entry opening. As successive portions of the flexible endless strip 12 are sequentially advanced, the tramp oil that has collected on the strip, as a result of the contact between the tramp oil and the strip, is removed. The scraper 21 is located so that the tramp oil is removed from the successive portions of the flexible endless strip 12 prior to the strip 12 advancing through the housing 14 and coming into contact with the advancing assembly 19 within the housing. The scraper 21 comprises a generally ring-shaped structure, or scraping annulus, which substantially surrounds and engages the exterior peripheral surface of the endless flexible strip 12 so as to scrape the tramp oil from the peripheral surface of the strip 12 as the successive portions of the strip 12 advance through the scraping annulus 21 and into the housing 14. Thus, the inside diameter of the scraping annulus 21 is sufficiently small that the tramp oil collected on successive portions of the endless flexible strip 12 is scraped and removed therefrom as the successive portions of the strip pass through the scraping annulus.

The scraping annulus 21 can engage the endless flexible strip 12 at a location where the strip 12 assumes a substantially horizontal position just adjacent to the opening 11 of the housing 14 so that tramp oil stripped from the endless flexible strip 12 can be received by a means (not shown) for capturing and directing the tramp oil that has been removed from the strip 12 by the scraping annulus 21 by gravity to a means for retaining the tramp oil that has been so removed, such as a tramp oil holding vessel, or storage tank, (not shown). The scraping annulus 21 is formed from a suitable material that is resistant to damage from oil such as, for example, ceramic or stainless steel. The scraping annulus 21 abuts the entry opening 11 of the housing 14 so that the scraping annulus is generally secured against movement with the tube 12 as a result of the passage of the successive portions of the tube through the scraping annulus and is able to perform its scraping function. In the case where the endless flexible strip is passed through the housing 14 in a reverse direction, and gear 40 is rotating in a clockwise direction, a scraping annulus would be provided at the opening 13 of the housing 14 to remove tramp oil from successive portions of the endless flexible strip 12 prior to the strip entering the housing 14 at opening 13. Also in that instance, a tramp oil drain would be located beneath opening 13. Similarly, scraping annuluses can be provided at openings 15 and 17 when those openings are serving as entry openings.

From the above description of the invention, those skilled in the art will perceive improvements, changes and modifications. Such improvements, changes and modifications are intended to be included within the scope of the description of the present invention and the claims that follow.

What is claimed is:

1. An apparatus for separating a first fluid from a mixture of fluids in a container, the first fluid being substantially immiscible with respect to one or more other fluids in the mixture, the apparatus comprising:
   an endless flexible strip of a material having an affinity for the first fluid and arranged to be advanced through the housing;
   an advancing assembly engaging the endless flexible strip for advancing the endless flexible strip first through an entry opening in the housing and thereafter through an exit opening in the housing, thereby advancing successive portions of the endless flexible strip sequentially from a position out of contact with the first fluid to a position of contact with the first fluid and again to a position out of contact with the first fluid;
   more than one pathway within the housing along which the endless flexible strip may be selectively advanced between an entry opening and an exit opening in the housing for each pathway; and
   means for removing from the endless flexible strip quantities of the first fluid that adhere to the endless flexible strip.

2. The apparatus of claim 1 wherein one pathway of the more than one pathway comprises a first pathway that includes a substantially straight first leg that proceeds from an entry opening and a substantially straight second leg that proceeds to an exit opening, the first leg and the second leg being joined at an angle of approximately 90 degrees.

3. The apparatus of claim 1 wherein one pathway of the more than one pathway comprises a second pathway that comprises a substantially straight line that extends between entry and exit openings in the housing along which the endless flexible strip is advanced.

4. The apparatus of claim 1 wherein one pathway of the more than one pathway comprises a third pathway that includes a substantially straight first leg that proceeds from an entry opening and a substantially straight second leg that proceeds to an exit opening and is substantially parallel to the first leg, the first leg and the second leg of the pathway being joined by an intermediate leg of the third pathway.

5. The apparatus of claim 1 wherein the assembly engaging the endless flexible strip is contained within the housing and comprises circular rotating gears having meshing gear teeth arranged around the circumference of each gear and cooperating surfaces for positively engaging the strip between the cooperating surfaces with sufficient force applied to the endless flexible strip so that rotative movement of the gears relative to one another sequentially advances successive portions of the endless flexible strip.

6. The apparatus of claim 5 wherein the endless flexible strip has a generally circular cross-section and the cooperating surfaces each have a concave configuration that is generally complementary with the circular cross-section of the endless flexible strip and is recessed radially inwardly of the meshing gear teeth of the circular rotating gear toward the axes of rotation of the circular rotating gear.

7. The apparatus of claim 6 wherein the means for removing from the endless flexible strip quantities of the first fluid that adhere to the endless flexible strip comprises a scraping annulus through which the successive portions of the endless flexible strip pass, the scraping annulus having an inside diameter sufficiently small that the first fluid is removed from the endless flexible strip as the successive portions of the endless flexible strip pass through the scraping annulus and the scraping annulus being located such that the first fluid is removed from the endless flexible strip prior to the successive portions of the endless flexible strip entering an entry opening in the housing.

8. An apparatus for separating a first fluid from a mixture of fluids in a container, the first fluid being substantially immiscible with respect to one or more other fluids in the mixture, the apparatus comprising:

- a housing having an entry opening and an exit opening;
- an endless flexible strip of a material having an affinity for the first fluid and arranged to be advanced through the housing;
- an advancing assembly engaging the endless flexible strip for advancing the endless flexible strip first through the entry opening in the housing and thereafter through the exit opening in the housing, thereby advancing successive portions of the endless flexible strip sequentially from a position out of contact with the first fluid to a position of contact with the first fluid and again to a position out of contact with the first fluid, wherein the assembly engaging the endless flexible strip is contained within the housing comprises circular rotating gears having meshing gear teeth arranged around the circumference of each gear on both sides of cooperating surfaces for positively engaging the strip between the cooperating surfaces with sufficient force applied to the endless flexible strip so that rotative movement of the gears relative to one another sequentially advances successive portions of the endless flexible strip;
- a pathway within the housing along which the endless flexible strip is advanced between the entry opening and the exit opening in the housing, the pathway comprising a substantially straight line between the entry opening and the exit opening in the housing along which the endless flexible strip is advanced; and
- means for removing from the endless flexible strip quantities of the first fluid that adhere to the endless flexible strip.

9. The apparatus of claim 8 wherein the endless flexible strip has a generally circular cross-section and the cooperating surfaces each have a concave configuration that is generally complementary with the circular cross-section of the endless flexible strip and is recessed radially inwardly of the meshing gear teeth of the circular rotating gear toward the axes of rotation of the circular rotating gear.

10. The apparatus of claim 9 wherein the means for removing from the endless flexible strip quantities of the first fluid that adhere to the endless flexible strip comprises a scraping annulus through which the successive portions of the endless flexible strip pass, the scraping annulus having an inside diameter sufficiently small that the first fluid is removed from the endless flexible strip as the successive portions of the endless flexible strip pass through the scraping annulus and the scraping annulus being located such that the first fluid is removed from the endless flexible strip prior to the successive portions of the endless flexible strip entering an entry opening in the housing.

11. An apparatus for separating a first fluid from a mixture of fluids in a container, the first fluid being substantially immiscible with respect to one or more other fluids in the mixture, the apparatus comprising:

- a housing having at least one entry opening and at least one exit opening;
- an endless flexible strip of a material having an affinity for the first fluid and arranged to be advanced through the housing;
- an advancing assembly engaging the endless flexible strip for advancing the endless flexible strip first through an entry opening in the housing and thereafter through an exit opening in the housing, thereby advancing successive portions of the endless flexible strip sequentially from a position out of contact with the first fluid to a position of contact with the first fluid and again to a position out of contact with the first fluid, the assembly engaging the endless flexible strip being contained within the housing and comprises circular rotating gears having meshing gear teeth arranged around the circumference of each gear on both sides of cooperating surfaces for positively engaging the strip between the cooperating surfaces with sufficient force applied to the endless flexible strip so that rotative movement of the gears relative to one another sequentially advances successive portions of the endless flexible strip;
- at least one pathway within the housing along which the endless flexible strip may be selectively advanced between one of the at least one entry opening and one of the at least one exit opening in the housing, at least one of the at least one pathway having a substantially straight first leg that proceeds from one of the at least one entry opening to a location between the cooperating surfaces of each gear where the cooperating surfaces positively engage the strip; and
- means for removing from the endless flexible strip quantities of the first fluid that adhere to the endless flexible strip.

12. The apparatus of claim 11 wherein the at least one of the at least one pathway having a substantially straight first leg that proceeds from one of the at least one entry opening to a location between the cooperating surfaces of each gear where the cooperating surfaces positively engage the strip additionally has a substantially straight second leg that proceeds in a substantially straight line from the location between the cooperating surfaces of each gear where the cooperating surfaces positively engage the strip to one of the at least one exit opening.

13. The apparatus of claim 11 wherein the at least one of the at least one pathway having a substantially straight first leg that proceeds from one of the at least one entry opening to a location between the cooperating surfaces of each gear where the cooperating surfaces positively engage the strip additionally has a second leg that proceeds from the location between the cooperating surfaces of each gear where the cooperating surfaces positively engaging the strip to one of the at least one exit opening at an angle of approximately 90 degrees to the substantially straight first leg.

14. The apparatus of claim 11 wherein the at least one of the at least one pathway having a substantially straight first leg that proceeds from one of the at least one entry opening to a location between the cooperating surfaces of each gear where the cooperating surfaces positively engage the strip additionally has a second leg that proceeds from the location between the cooperating surfaces of each gear where the cooperating surfaces positively engage the strip to one of the at least one exit opening in a direction that is generally parallel to the substantially straight first leg.

* * * * *